United States Patent
Millet et al.

(10) Patent No.: US 9,112,339 B2
(45) Date of Patent: Aug. 18, 2015

(54) ELECTRICAL HARNESS EQUIPPED WITH A DEVICE TO SPACE ITS ELECTRICAL CONDUCTORS AT THE LEVEL OF A PARTITION PASSAGE

(71) Applicant: AIRBUS OPERATIONS SAS, Toulouse (FR)

(72) Inventors: Gérard Millet, Pibrac (FR); Antoine Burckhart, Gagnac-sur-Garonne (FR); Alexandre Reze, Saint Sulpice (FR)

(73) Assignee: Airbus Operations (S.A.S.), Toulouse (FR)

( * ) Notice: Subject to any disclaimer, the term of this patent is extended or adjusted under 35 U.S.C. 154(b) by 132 days.

(21) Appl. No.: 13/658,525

(22) Filed: Oct. 23, 2012

(65) Prior Publication Data

US 2013/0105217 A1    May 2, 2013

(30) Foreign Application Priority Data

Oct. 26, 2011   (FR) ...................................... 11 59695

(51) Int. Cl.
   *H02G 3/22*     (2006.01)
   *H02G 3/04*     (2006.01)
(52) U.S. Cl.
   CPC ............... *H02G 3/0406* (2013.01); *H02G 3/22* (2013.01)

(58) Field of Classification Search
   CPC ......... E04F 19/04; H02G 3/0425; H02G 3/22
   USPC ......................................................... 174/72 A
   See application file for complete search history.

(56) References Cited

U.S. PATENT DOCUMENTS

| | | | | |
|---|---|---|---|---|
| 5,831,217 A | * | 11/1998 | Jarvis et al. | 174/153 R |
| 2007/0246613 A1 | * | 10/2007 | Kennedy | 248/56 |
| 2010/0059941 A1 | * | 3/2010 | Beele | 277/606 |
| 2011/0088342 A1 | * | 4/2011 | Stahl et al. | 52/220.8 |
| 2011/0259637 A1 | * | 10/2011 | Winship | 174/667 |
| 2012/0104007 A1 | * | 5/2012 | Beele | 220/676 |

* cited by examiner

*Primary Examiner* — Zachary M Pape
*Assistant Examiner* — Douglas Burtner
(74) *Attorney, Agent, or Firm* — Jenkins, Wilson, Taylor & Hunt, P.A.

(57) ABSTRACT

The object of the invention is an electrical harness having a plurality of electrically conductive elements held one against another in a braided sheath obtained by braiding strands around the electrical conductor elements, the strands being joined and forming a web around the electrical conductor elements when held against each other, wherein it includes a device to space comprising at least one portion with a peripheral surface at the level of which channels are provided wherein an electrical conductor fits, said portion having a section such that it allows to obtain spaced strands at the level of said device to space when the sheath is being braided around the electrical conductor elements.

5 Claims, 3 Drawing Sheets

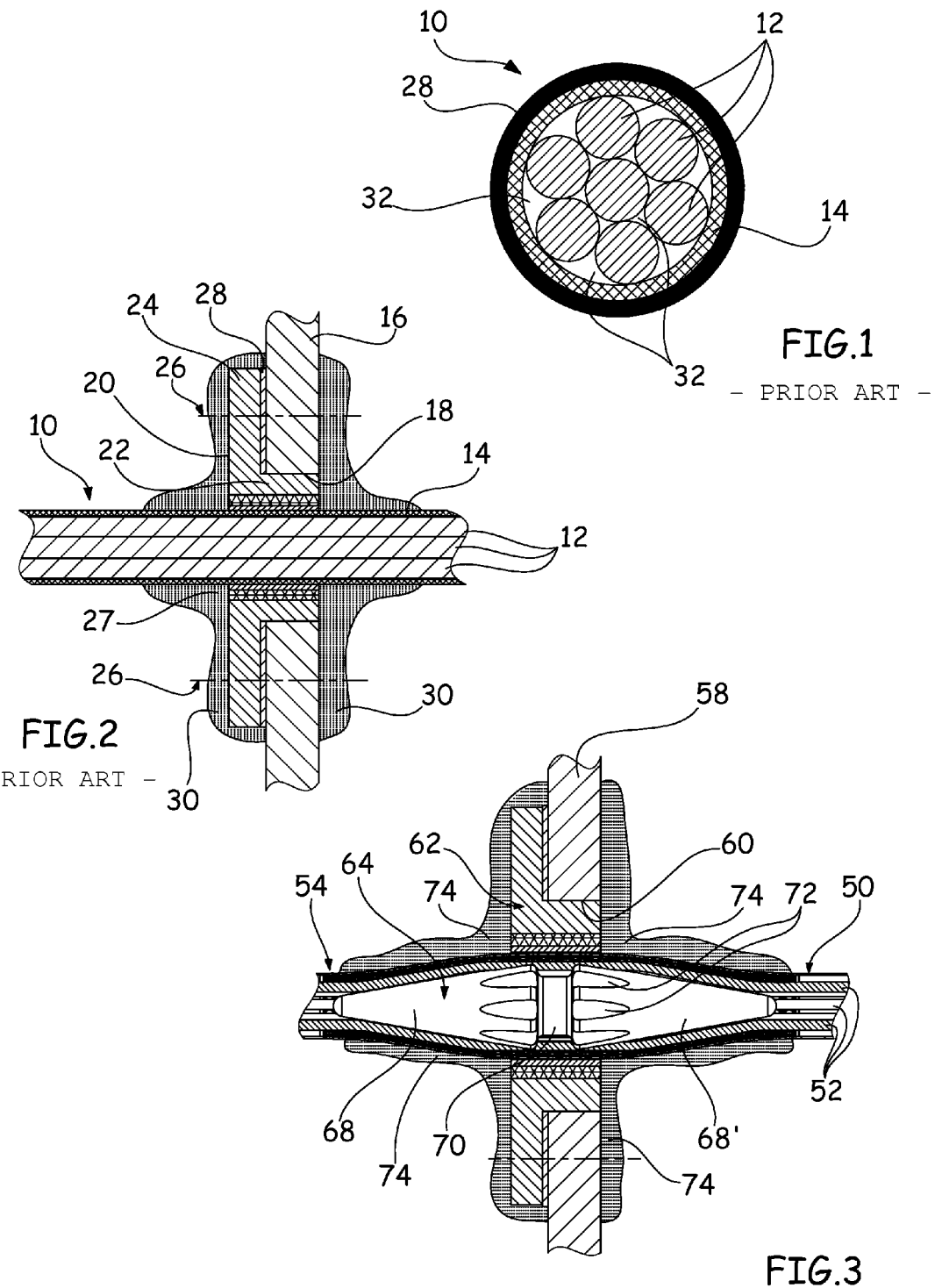

ELECTRICAL HARNESS EQUIPPED WITH A DEVICE TO SPACE ITS ELECTRICAL CONDUCTORS AT THE LEVEL OF A PARTITION PASSAGE

FIELD OF THE INVENTION

The present invention relates to an electrical harness equipped with a device to space its electrically conductive elements at the level of a partition passage and a method for sealing between an electrical harness and a partition which said harness is passing through.

BACKGROUND

In a known manner, as illustrated in FIGS. 1 and 2, an electrical harness 10 includes several conductive elements 12 which are held one against another in a braided sheath 14.

For the rest of the description, the term 'conductive element' is at least one wire of electrically conductive material, whatever its diameter, surrounded or not by an insulating material.

Thus, one conductive element may be composed of several small section wires, coated with a plastic sheath. Alternatively, a conductive element may comprise a plurality of cables each comprising a plurality of metal wires coated with a plastic sheath, said cables being coated with a plastic sheath.

Once the conductive elements are grouped, a sheath 14 is braided around conductive elements 12 not only to keep them pressed against each other but also to protect them. Braided sheath 14 is formed from strands e.g. in cotton or polyester. It is preferably coated with a varnish.

An electrical harness 10 may pass through a partition 16 through an hole 18 formed in said partition, as illustrated in FIG. 2.

In some applications, such as when an electrical harness passes through an aircraft tank partition, it is necessary to ensure a perfect seal between harness 10 and partition 16.

According to one embodiment, hole 18 has a diameter greater than the outside diameter of electrical harness 10. To provide a seal, an annulus seal 20 is inserted between partition 16 and harness 10. It comprises a central part 22 which outer diameter is substantially identical to that of hole 18, and a flange 24, one of the faces of which is pressed against passed through partition 16. Connecting means such as bolts 26 are provided to secure annulus seal 20 to partition 16. A seal 28 in the form of a disc with a central hole is inserted between flange 24 and partition 16 as a seal between annulus seal 20 and partition 16.

Central part 22 comprises sealing means 27 for sealing between the harness and the annulus seal, or more precisely between a ring consisting of a matrix resin, which inner diameter is identical to the outer diameter of electrical harness 10, and the rest of the annulus seal.

Additionally, electrical harness 10 and annulus seal 20 are coated with a coating product 30 to provide a seal on both sides of the partition. In order to obtain the required seal, at least six layers of coating material 30 must be applied.

The application of coating material 30 to the outside of braided sheath 14 does not guarantee optimum seal since leaking paths 32 remain inside the braided tube between the conductive elements. Such leaking paths 32 are difficult to fill because the coating resin can hardly reach these sheath inner areas whatever the mode of application.

SUMMARY

Thus, the present invention aims at overcoming the drawbacks of the prior art by providing an electrical harness equipped with a device to improve the seal at the level said wiring harness passes through a partition.

To this end, the invention relates to an electrical harness having a plurality of electrically conductive elements held one against another in a braided sheath obtained by braiding strands around the electrically conductive elements, the strands being joined and forming a web around electrically conductive elements when held against each other, wherein it includes a device to space comprising at least a portion with a peripheral surface at the level of which channels are provided in which fits an electrical conductor, said portion having a section such that it allows to obtain spaced strands at the level of said device to space when the sheath is braided around the electrically conductive elements.

BRIEF DESCRIPTION OF THE DRAWINGS

Other features and advantages will become apparent from the following description of the invention, description provided as an example only, with reference to the accompanying drawings in which:

FIG. 1 is a cross section of a coated electrical harness according to prior art, FIG. 2 is a longitudinal cross section of an electrical harness passing through a partition according to prior art, FIG. 3 is a longitudinal section of an electrical harness passing through a partition according to the invention.

DETAILED DESCRIPTION

Figure 5:
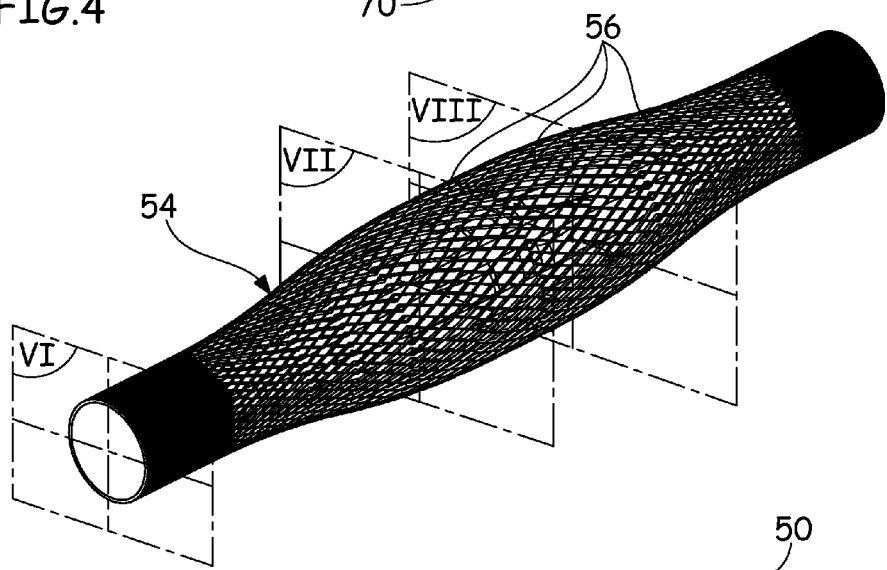
FIG. 5 is a perspective view of a portion of an electrical harness with the device of FIG. 4, without the ring and without sealing agent.
Figure 6:
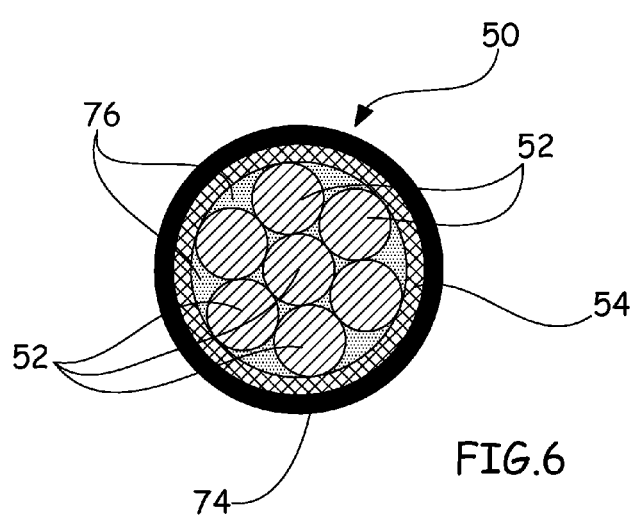
FIG. 6 is a cross section along plane VI in FIG. 5, 7A is a cross section along plane VII in FIG. 5, before coating, 7B is a cross section along plane VII in FIG. 5, after coating, 8A is a cross section along plane VIII in FIG. 5, before coating, 8B is a cross section along plane VIII in FIG. 5, after coating.

In FIGS. 3 and 6, an electrical harness 50 is shown comprising a plurality of electrically conductive elements 52 which are held against each other in a braided sheath 54. Said braided sheath 54 is obtained in a known manner by braiding strands 56 about electrically conductive elements 52, as illustrated in FIG. 5. For a given diameter, corresponding to the diameter of the imaginary cylindrical envelope formed by regrouped electrically conductive elements 52, strands 56 are joined and form a web surrounding electrically conductive elements 52.

Electrically conductive elements 52 and braided sheath 54 are not further detailed because they are known to the skilled person.

As shown in FIG. 3, said electrical harness 50 passes through a partition 58 via a hole 60. Preferably, as illustrated in FIG. 3, a annulus seal 62 is inserted between electrical harness 50 and partition 58. Annulus seal 62 is not further detailed as it is known in the art and may be identical to the annulus seals of the prior art with a diameter for passing the harness that may be larger if necessary, as explained later.

For the rest of the description, longitudinal direction means the direction parallel to the direction of the electrical conductors. A longitudinal plane includes the longitudinal direction. A transverse plane is a plane perpendicular to the longitudinal direction. A radial direction is a direction perpendicular to the longitudinal direction.

According to the invention, the portion of electrical harness 50 at the level of the partition comprises a device to space 64 electrically conductive elements 52.

Figure 4:
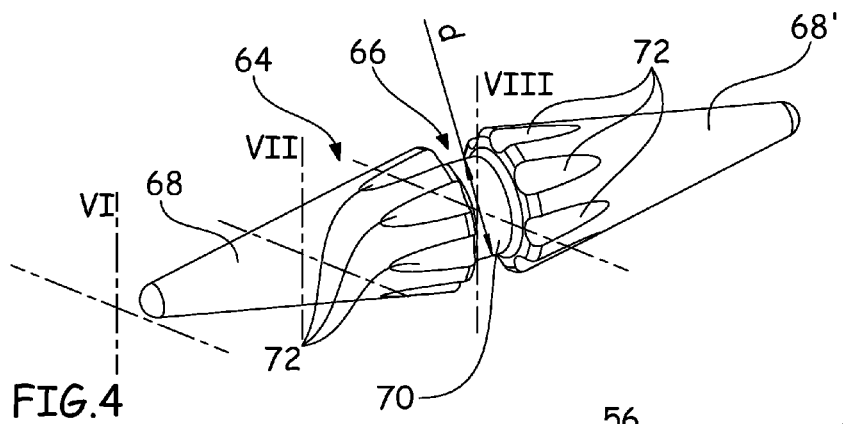
FIG. 4 is a perspective view of a device to space electrically conductive elements of an harness according to a variant of the invention, without the electrically conductive elements.

In a first embodiment of the invention illustrated in FIGS. 3 to 5, 7A, 7B, 8A and 8B, the device to space 64 comprises, as shown in detail in FIG. 4, a central part 66 extended on both sides by approximately conical portions 68, 68', the tip of portions 68, 68' being oriented in opposite directions, the large diameter of each portion 68, 68' being adjacent to central part 66. Preferably, said device to space 64 is symmetrical with regard to a median transverse plane.

Central part 66 includes an annular groove 70, with a diameter d at the level of its smallest section in a transverse plane. According to one embodiment, annular groove 70 has a U-shaped section in a longitudinal plane.

At least one of the two conical portions 68, 68', preferably both, comprises at the level of its peripheral face, channels 72 arranged in longitudinal planes. Preferably, each channel 72 extends only over a part of each conical portion 68 or 68'. A channel 72 is provided to receive or not an electrically conductive element 52 according to the number of conductive elements. Advantageously, device 64 has a number of channels greater than or equal to the number of electrically conductive elements of the harness. The channels of a first conical portion 68 are aligned with the channels of the other conical portion 68'.

Figure 7A:
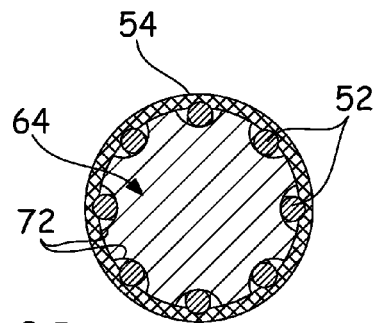
Figure 8A:
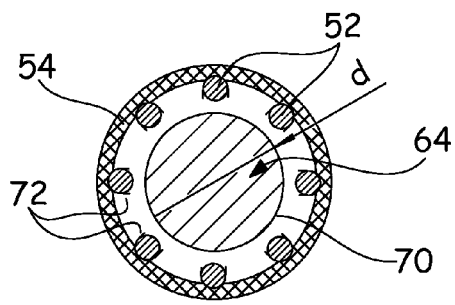

Each channel 72 opens into annular groove 70. According to one important aspect of the invention, each groove 72 at the level of its end opens into annular groove 70. At this level, the bottom of channel 72 is distant from the longitudinal axis by a distance D greater than d/2. Thus, an electrically conductive element 52 accommodated in two channels 72 arranged on both sides of annular groove 70 contacts the bottom of channels 72 as shown in FIG. 7A, and is distant from the bottom of annular groove 70 as illustrated in FIG. 8A.

Preferably, channels 72 have a section in a transverse plane greater than the section of electrically conductive elements 52.

Device 64 is positioned between the electrically conductive elements before completing braided sheath 54, each conductive element being placed in a channel. Following, the sheath is braided around conductive elements 52 which are spaced at the level of device 64. The braiding technique is not further detailed because it is known to the skilled person.

As with the prior art, strands 56 are joined at the level of the harness portions without device to space 64. Given the greater diameter of the imaginary coating of the electrically conductive elements at the level of device to space 64, strands 56 are spaced at the level of the harness portion provided with a device to space 64, as illustrated in FIG. 5.

When the harness is in place, the portion of the latter equipped with a device 64 for spacing electrically conductive elements 52 and hence the strands of braided sheath 54, is arranged at the level of the passed through partition 58, as illustrated in FIG. 3. The inside diameter of the annulus seal is greater compared to that of a annulus seal of the prior art to account for the expansion of the harness diameter at the level of device to space 64. Placing the annulus seal is not detailed because the skilled man can proceed in the same manner as with prior art.

Following, the portions of the harness arranged on each sides of the partition are coated with a coating material 74 for sealing, e.g. a resin or a sealant. The operator can use the same tools for this coating as with prior art.

Figure 7B:
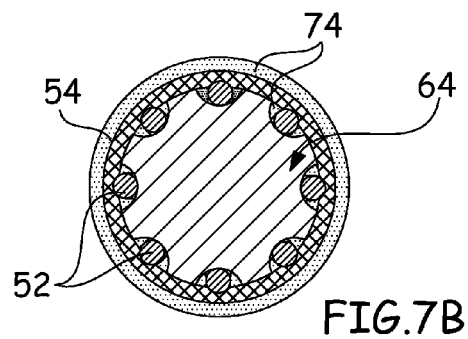
Figure 8B:
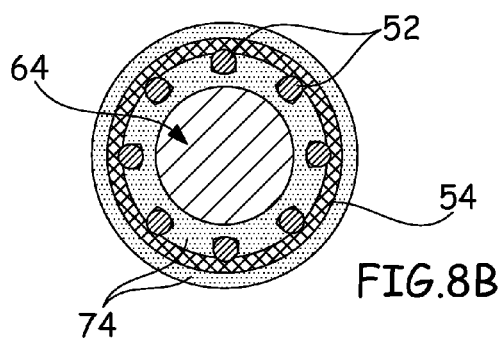

Unlike with the prior art, braided sheath strands 56 are spaced at the level of the passed through partition so that the spaces between electrically conductive elements 52 and device to space 64 at the level of annular groove 70 are filled with coating material 74 as shown in FIG. 8B. In so far as coating material 74 may enters the braided sheath through device to space 64, it penetrates into channels 72 between sheath 54 and electrically conductive elements 52, as illustrated in FIG. 7B and may reach areas 76 between electrically conductive elements 52 on both sides of device 64, as illustrated in FIG. 6.

Advantageously, annulus seal 62 is coated in the same manner as in prior art.

According to another alternative implementation, electrically conductive elements 52 are mounted on device to space 64, then they are coated in order to control the first coating. Braided sheath 54 is then produced. Such assembly is coated again to provide a intermediary new control. Finally, electrical harness 50 is position, passing through the annulus seal and the partition. The assembly is again coated.

The invention is not limited to the device to space electrically conductive elements, shown in FIG. 4.

Other variants are possible, examples of which are illustrated in FIGS. 9-12.

Figure 9:
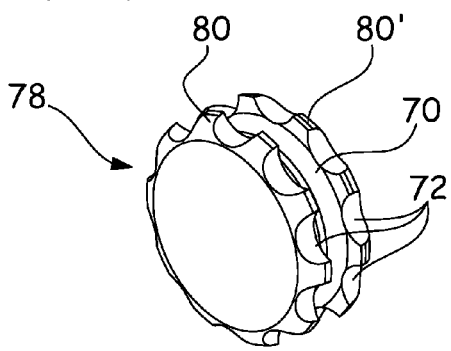
FIG. 9 is a perspective view of a device to space the electrically conductive elements of a harness according to another embodiment of the invention.
Figure 10:
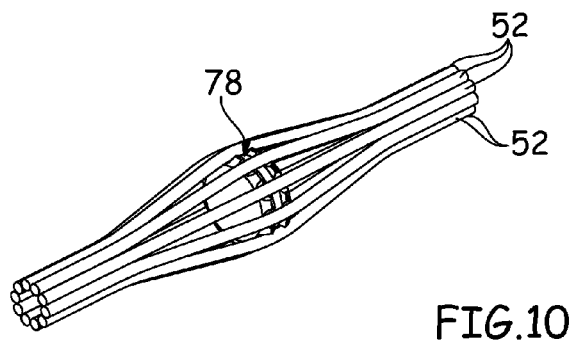
FIG. 10 is a perspective view of a portion of an electrical harness equipped with the device in FIG. 9 (without the braided sheath)

As shown in FIGS. 9 and 10, a device to space 78 may include, instead of conical portions 68, 68' of device 64, tapered portions 80, 80'. As in the previous example, such tapered portions 80, 80' separated by an annular groove 70 includes channels 72 located on the peripheral surfaces of the tapered portions. For each grove, the distance between the bottom of channel D and the longitudinal axis is greater than d/2, d being the diameter of the bottom of the annular groove.

Figure 11:
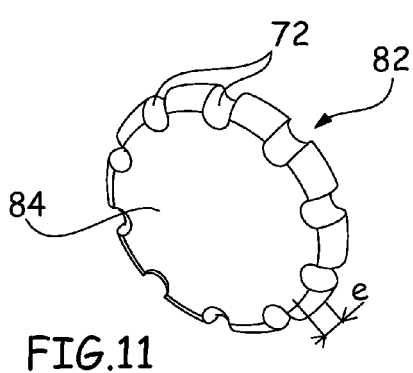
FIG. 11 is a perspective view of a device to space the electrically conductive elements of a harness according to another embodiment of the invention.
Figure 12:
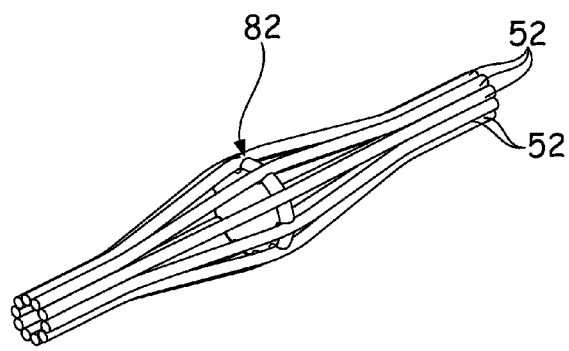
FIG. 12 is a perspective view of a portion of an electrical harness equipped with the device in FIG. 11 (without the braided sheath).

In another embodiment illustrated in FIGS. 11 and 12, a device to space 82 has a substantially cylindrical shape with a thickness e preferably less than its diameter. Such diameter is sufficient to obtain, during the braiding of braided sheath 54, spaced strands 56 allowing for coating material 74 to penetrate the sheath. Such device to space 82 comprises a swollen peripheral wall at which level channels 72 are provided wherein an electrically conductive element may fit. On at least one end face 84, the bottoms of channels 72 are spaced so that the electrically conductive elements are spaced on both sides of device to space 82, which keeps them all well sunk in coating material 74.

Whatever the embodiment, the device to space comprises at least one portion having a peripheral surface at the level of which channels 72 are provided wherein an electrical conductor fits. This portion of the device to space has a cross section such that it provides for strands 56 spaced at the level of the device to space when the sheath is braided around the electrically conductive elements. Preferably, this section is circular and has a diameter which ensures sufficient spacing between strands 56, and that such spacing is compatible with the fluidity of the coating material to ensure its proper distribution.

In addition, the device to space has shapes allowing to space the electrically conductive elements from each other, or to space the electrically conductive elements from said device. In a first embodiment, each channel is split into two channel portions by an intersecting groove, the bottom of the groove being offset toward the center of the device relative to the bottom of the channel portions opening into the intersecting groove, as shown in FIGS. 4 and 9.

The invention claimed is:

1. An electrical harness having a plurality of electrically conductive elements held one against another in a braided sheath obtained by braiding strands around the electrical conductor elements, the strands being joined and forming a web around electrical conductor elements when held against each other, wherein the electrical harness includes a device to space, the device to space comprising:

two portions connected by a central part, at least one of the two portions with a peripheral surface at a level of which channels are provided wherein an electrical conductor fits, the at least one portion having a section such that it allows to obtain strands spaced at a level of the device to space when the sheath is braided around the electrical conductor elements, and an annular groove disposed in the central part, the annular groove having an annular groove bottom being offset towards a center of the device relative to channel bottoms opening into the annular groove, wherein a coating material is configured to penetrate the channels between the braided sheath and the electrical conductor elements and fill spaces between the electrical conductor elements and the device to space at a level of the annular groove wherein the portions are conical or tapered, a greatest diameter of each portion being adjacent to the central part.

2. The electrical harness according to claim 1, wherein the device to space comprises a peripheral partition at the level of which grooves are provided wherein an electrically conductive element may fit, and at least one planar end face into which the channels open in a spaced fashion.

3. The electrical harness according to claim 2, wherein the device to space is cylindrical, and the channel bottoms are distributed over a circle.

4. The electrical harness according to claim 1, wherein the channels of a first portion are aligned with the channels of the other portion.

5. The electrical harness according to claim 1, wherein a channel cross section is greater than a conductive element section.

* * * * *